Dec. 10, 1968    C. L. STACY, JR., ET AL    3,415,963
ETHYL CELLULOSE COMPOSITION FOR USE IN
ARC EXTINGUISHING APPARATUS
Filed May 15, 1964
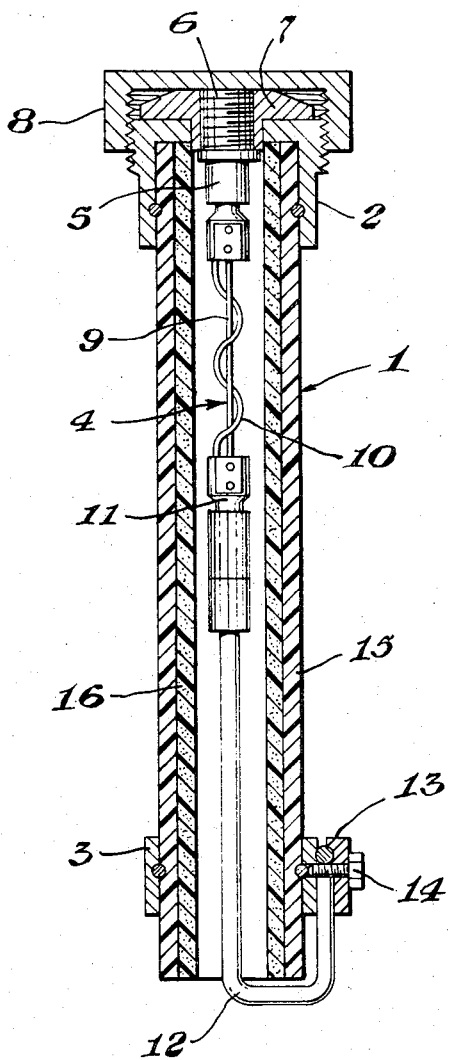
INVENTORS.
Charles L. Stacy, Jr.
Garth H. Beaver
BY Albin R. Lindstrom
AGENT 3,415,963
ETHYL CELLULOSE COMPOSITION FOR USE IN ARC EXTINGUISHING APPARATUS
Charles L. Stacy, Jr., and Garth H. Beaver, Midland, Mich., assignors to The Dow Chemical Company, Midland, Mich., a corporation of Delaware
Filed May 15, 1964, Ser. No. 367,926
11 Claims. (Cl. 200—144)

This invention relates to improved ethyl cellulose compositions. More particularly, it relates to those compositions having improved thermal stability and increased resistance to oxidative degradation.

Cellulose ethers, such as ethyl cellulose, have found widespread and diversified use in many fields. Among those many uses there is one disclosed and claimed in U.S. Patent 3,111,567, issued Nov. 19, 1963, for an arc extinguishing material in a circuit interrupter. The concept disclosed in that patent involves the use of a fuse tube having an insulating lining made of a formulation of a plastic material, such as ethyl cellulose and molybdenum disulfide. It is demonstrated that such bi-component compositions greatly extend the life of the fuse tube over those having linings of prior used materials, such as bone fiber. When ethyl cellulose is the plastic material employed, however, that life, although increased over prior formulations, is still less than optimum due to degradation of the plastic lining under the extreme environmental conditions encountered in the arcing.

It is the principal object of the present invention to provide an improved ethyl cellulose composition, such composition having improved thermal stability, increased resistance to oxidation, and generally improved properties for withstanding the severe conditions imposed by high voltage arcing.

It is a further object to provide such a composition which can be used as an insulating material for a circuit interrupter.

The above and related objects are achieved with a composition comprising (1) ethyl cellulose, (2) molybdenum disulfide, and (3) an amine antioxidant. Also comprehended within the scope of the invention is a circuit interrupting device employing such composition as an insulating lining.

The compositions of their invention may be based upon any of the commercially available ethyl celluloses. These are usually those derivatives having a degree of substitution of from about 2.0 to about 2.75 ethoxy groups per anhydroglucose unit. Because those are the ethers which have been found to have optimum properties and characteristics for most end uses, they are consequently the preferred base materials for use in these compositions. It should be understood, however, that ethyl cellulose derivatives having greater or smaller degrees of substitution than those indicated above may be employed if desired.

Cellulose ethers, such as ethyl cellulose, are also characterized and sold commercially by viscosity grade. For purposes of this application, the term "viscosity grade" will be construed to have its usual meaning that it is the viscosity of a 5 percent by weight solution of the cellulose ether in a 60:40 toluene-ethanol solvent measured at 25° C. It has been found that the function of the formulations of this invention is independent of the viscosity grade of the ethyl cellulose. However, for practical reasons, the intermediate viscosity grades, such as from about 50 to 100 centipoises are most convenient to fabricate into sheets and similar articles, particularly when those articles are prepared by molding, extrusion, or by casting a solution of the composition. Those viscosity grades are therefore preferred.

Plastic compositions, such as those of ethyl cellulose, are usually plasticized for ease in fabrication and for adjustment of the properties to achieve the optimum community of properties and characteristics for any given end use. Ethyl cellulose is compatible with a wide variety of plasticizers including the phthalates, phosphates, glycerides, and other esters of higher fatty acids and amides. Representative of those plasticizers are dibutyl phthalate, dibutyl sebacate, butyl stearate, butyl ricinoleate, and the glycol esters of coconut oil fatty acids. The technical literature is abundant with examples of useful plasticizers to be employed with ethyl cellulose. Generally, such plasticizers are employed in amounts of from 1 to about 50 percent by weight of the ethyl cellulose depending upon the mode of fabrication to be used, the particular plasticizer and ethyl cellulose employed, and the properties desired in the resulting article. The amount of plasticizer in any given instance will be readily determinable by simple preliminary experiment. For thermal extrusion or other similar thermal fabrication means to prepare fuse tube linings, the amount of plasticizer preferably will fall in the range of from about 6 to 14 percent.

As noted in U.S. Patent 3,111,567, the amount of molybdenum disulfide to be used in the composition to achieve the desired arc extinguishing properties should be in the range of from about 0.1 to 15 percent by weight of the plastic material employed. The molybdenum disulfide should be finely divided to provide for the most uniform distribution of that compound throughout the whole article. Other arc extinguishing materials in which the molybdenum disulfide can be compatibly dispersed will likewise provide acceptable circuit interrupting structures within the comprehension of the present invention.

Representative species of the amine antioxidants are described by J. M. Buist in "Aging and Weathering of Rubber," W. Heffer and Sons, Limited, chapter 8, 1956. In that chapter, the author identifies two main categories of commercial antioxidants and under one category, namely, the amines and their derivatives, he has six subclassifications. Any amine antioxidant falling within these six subclassifications is operable in the concept of the present invention. The preferred amine antioxidants are the p-phenylene diamines and the substituted diphenyl amines.

The mechanism of stabilization is not completely understood. The addition of molybdenum disulfide renders the ethyl cellulose less stable to degradation. Phenolic antioxidants, when used with molybdenum disulfide in ethyl cellulose, result in a polymer that is slightly more heat stable than the ethyl cellulose-molybdenum disulfide combination; but less stable than ethyl cellulose with the same quantity of antioxidant in the absence of molybdenum disulfide. The overall effect of phenolic antioxidant and molybdenum disulfide in ethyl cellulose is antagonism.

In contrast, amine antioxidants show a strong synergism when used with molybdenum disulfide in ethyl cellulose. This is illustrated by the data in Table I.

The proportions of each of the three essential ingredients may be varied within wide limits, depending upon the properties desired in the final article. In general, the ethyl cellulose should be present in the composition in from 80 to 120 parts, the molybdenum disulfide from 0.1 to 15 percent by weight of the ethyl cellulose, and the amine antioxidant in amount of up to 5 percent, preferably 0.01 to 2 percent, of the ethyl cellulose in the composition. Although some departure from the proportions noted may be made and successful fuse tube linings result, nevertheless, optimum properties for that application are attained within the aforenoted proportions.

Other additives, such as pigments, dyes, plasticizers, stabilizers, fillers, and the like, which are commonly incorporated in cellulose ether formulations may be used in these compositions. A preferred additive to further upgrade the properties of the final formulation is the use of carbon black. Carbon black acts as an ultraviolet light stabilizer. When so used, it should be present in the compositions in an amount of from about 0.5 to 5 percent by weight of the ethyl cellulose.

Many end use applications involve thermal molding and extrusion techniques. For those procedures, it is generally necessary for facile fabrication to include a plasticizer for the ethyl cellulose in amount of about 1.0 to 20 or more percent by weight. Typical of such plasticizers are the phthalate esters, the phosphates, the glycerides and other esters of fatty acids and amides. One widely used plasticizer is n-butyl stearate.

The various ingredients may be blended by any conventional means. The intermixing should be thorough enough to provide a uniform distribution of all of the ingredients throughout the whole composition.

The composition may be fabricated into articles by known means, such as thermal extrusion or molding. Typical of the articles for which the compositions of this invention are especially well adapted include fuse boxes, switches, transformer housings, fuse tube linings, lightning rods, and others.

In the appended drawing there is illustrated a vertical section of a circuit interrupter embodying a fuse tube of the invention.

The drawing illustrates a circuit interrupter comprising a generally cylindrical tube 1 provided with terminals 2 and 3 at its ends. The terminals 2 and 3 are connected by a replaceable fuse link illustrated generally at 4. Fuse link 4 comprises an upper terminal 5 having a threaded shank 6 which is received within a threaded opening in a button head 7. The button head 7 encloses the upper end of the terminal 2 and is secured thereto by a cap screw 8.

A strain wire 9 and a fusible element 10 are connected to the terminal 5 and the lower ends of the wires 9 and 10 are connected to a lower terminal 11 which is connected to the lower fuse tube terminal 3 by a flexible conducting lead 12. The conducting lead 12 is clamped to the lower terminal by a clamp 13 which is held in place by a screw 14.

According to the invention, the tube 1 includes an outer casing 15 and an inner liner 16, although the outer casing which provides additional insulation and strength may be eliminated in applications where such physical properties are not essential.

The advantages and benefits derivable from the compositions will be illustrated by the following examples wherein all parts and percentages are by weight.

Example 1

Several high voltage circuit interrupters were prepared which were identical except for the fuse tube lining. In one such lining there was employed a composition consisting of ethyl cellulose, butyl stearate, molybdenum disulfide, and di-$\beta$-naphthyl-p-phenylene diamine. For comparison, a fuse tube lining was prepared from a composition of nylon 6 and molybdenum disulfide. Still another was prepared from bone fiber, which is a resin impregnated cellulose material. The fuses prepared with the various linings were then tested for the number of exposures or fuse blowings which could be tolerated before failure. The stabilized ethyl cellulose composition of this invention survived 15 such exposures, the nylon composition survived two, and the bone fiber survived one exposure.

Example 2

Several compositions were prepared employing a base composition consisting of ethyl cellulose and 10 percent n-butyl stearate. To these compositions were added various amine antioxidants. To some there was added 5 parts molybdenum disulfide. In addition, to some there was added carbon black.

Oxygen absorption was measured as a function of time as samples were heated under pure oxygen in a circulating closed system. Sample temperature was maintained at 150° C. When oxygen absorbed is plotted against time, an induction period occurs during which the rate of oxidation is very slow. This is followed by a sharp increase in the rate of oxidation which approaches a steady state. When the steady state rate on the absorption-time curve is extrapolated to zero absorption, the intercept on the time axis is called the oxidation induction time. An increase in induction time is indicative of better thermal stability for the polymer. The results with the indicated compositions are shown in Table I.

TABLE I

| Sample | Antioxidant | Percent Antioxidant | MoS$_2$ | Percent Carbon Black | Oxidation induction time (hrs.) |
|---|---|---|---|---|---|
| 1 | None | | 5 | | 0 |
| 2 | do | | 5 | 2 | 0.8 |
| 3 | DPPD[1] | 0.1 | None | | 10 |
| 4 | DPPD[1] | 0.1 | 5 | | 24.9 |
| 5 | Agerite White[2] | 0.1 | None | | 7.5 |
| 6 | do | 0.1 | 5 | | 18.1 |
| 7 | Agerite Stalite[3] | 0.15 | | | 3.6 |
| 8 | do | 0.15 | 5 | | 12.0 |
| 9 | Agerite White[2] | 0.1 | 5 | | 14.0 |
| 10 | do | 0.1 | 5 | 2 | 24.0 |

[1] DPPD=diphenyl-p'-phenylene diamine.
[2] Agerite White=di-$\beta$-naphthyl-p-phenylene diamine.
[3] Agerite Stalite=a mixture of octylated diphenyl amines.

When similar compositions were prepared except that certain phenolic antioxidants were employed in place of the amines and the compositions tested identically to those above, the following results were obtained:

TABLE II

| Sample | Antioxidant | Percent Antioxidant | MoS$_2$ | Percent Carbon Black | Oxidation induction time (hrs.) |
|---|---|---|---|---|---|
| 11 | Santonox R[1] | 0.1 | None | | 4 |
| 12 | do | 0.1 | 5 | | [2]44 |
| 13 | Ionol[3] | 0.1 | None | | 1.8 |
| 14 | do | 0.1 | 5 | | 1.3 |

[1] Santonox R=4,4'-thiobis(3-methyl-6-t-butyl)phenol.
[2] Minutes.
[3] Ionol=2,6-ditertiarybutyl-p-cresol.

As is evident, the compositions which contain both the molybdenum disulfide and the amine antioxidant are far superior in their resistance to degradation than those which omit either one of the ingredients. Also, the compositions which contain carbon black, in addition to the antioxidant and the molybdenum disulfide, are still more resistant to degradation. This pattern of results is true for all compositions falling within the previously discussed range of proportions of the various ingredients.

What is claimed is:

1. A thermally stable, oxidation resistant composition consisting essentially of (1) ethyl cellulose, (2) from about 0.1 to about 15 percent by weight of molybdenum disulfide, and (3) from 0.01 to 5 percent by weight of an amine antioxidant both of (2) and (3) being based on the weight of ethyl cellulose.

2. The composition of claim 1 wherein said amine antioxidant is a p-phenylene diamine derivative.

3. The composition of claim 2 wherein said amine antioxidant is di-$\beta$-naphthyl-p-phenylene diamine.

4. The composition of claim 2 wherein said amine antioxidant is diphenyl-p'-phenylene diamine.

5. The composition of claim 1 wherein said amine antioxidant is a substituted diphenyl amine antioxidant.

6. The composition of claim 5 wherein said amine antioxidant is a mixture of octylated diphenyl amines.

7. The composition of claim 1 wherein said composition contains a plasticizer for the ethyl cellulose.

8. The composition of claim 7 wherein said plasticizer is n-butyl stearate.

9. A thermally stable, oxidation resistant composition consisting essentially of (1) ethyl cellulose, (2) 0.1 to 15 percent by weight of molybdenum disulfide, (3) from 0.01 to 5 percent of an amine antioxidant, and (4) 0.5 to 5 percent by weight of carbon black each of (2), (3) and (4) being based on the weight of ethyl cellulose.

10. An arc extinguishing apparatus comprising means for establishing an arc and an arc extinguishing member consisting essentially of about 0.1 to 15 percent by weight of molybdenum disulfide, from 0.01 to about 5 percent by weight of an amine antioxidant, with the remainder being ethyl cellulose being disposed along the path of the arc and in arc extinguishing proximity thereto.

11. An arc extinguishing apparatus comprising means for establishing an arc and an arc extinguishing member consisting of about 0.1 to 15 percent by weight of molybdenum disulfide, 0.01 to about 5 percent by weight of an amine antioxidant, from about 0.5 to 5 percent by weight of carbon black, with the remainder of ethyl cellulose, said arc extinguishing member being disposed along the path of the arc and in arc extinguishing proximity thereto.

References Cited

UNITED STATES PATENTS

| | | | |
|---|---|---|---|
| 2,184,539 | 12/1939 | Wiggam | 106—193 |
| 2,413,011 | 12/1946 | Traylor et al. | 106—193 |
| 2,425,351 | 8/1947 | Sharphouse et al. | 106—186 |
| 3,111,567 | 11/1963 | Stewart et al. | 200—120 |

DONALD J. ARNOLD, *Primary Examiner.*

U.S. Cl. X.R.

106—15, 186, 193, 197; 200—149, 120